(12) United States Patent
Rowan

(10) Patent No.: US 7,052,345 B1
(45) Date of Patent: May 30, 2006

(54) ANIMAL FLOTATION DEVICE

(76) Inventor: Charles Rowan, 8761 SW. 192 St., Miami, FL (US) 33157

( * ) Notice: Subject to any disclaimer, the term of this patent is extended or adjusted under 35 U.S.C. 154(b) by 0 days.

(21) Appl. No.: 11/248,973

(22) Filed: Oct. 11, 2005

(51) Int. Cl.
*B63C 9/00* (2006.01)
(52) U.S. Cl. .......................... 441/80; 119/850
(58) Field of Classification Search ............... 441/80, 441/114–119, 88; 119/850
See application file for complete search history.

(56) References Cited

U.S. PATENT DOCUMENTS

| 1,265,580 | A | * | 5/1918 | Zofchak | 441/88 |
| 1,480,417 | A | * | 1/1924 | Potter | 441/115 |
| 1,901,906 | A | * | 3/1933 | Farmer et al. | 441/118 |
| 5,894,817 | A | * | 4/1999 | Manuel | 119/497 |
| D510,160 | S | * | 9/2005 | Rominger | D30/199 |

* cited by examiner

*Primary Examiner*—Ed Swinehart

(57) ABSTRACT

An animal flotation device that provides full support under the animal with flotation pods on both sides and an additional detachable flotation pod located under the head of the animal to prevent the head and nose from going under water. The front flotation pod hangs down when out of the water and immediately supports the head of the animal when in the water. The front legs of the animal pass through holes located in the front of the center support to prevent the animal from slipping out of the device while in use, either on land or water. To keep the unit secured on the animal, there are two sets of straps, one located just behind the front legs of the animal and the second set located just in front of the rear legs of the animal. The straps have quick releases for ease and rapidity of use during attachment and detachment. The device is made of nylon for durability and is bright yellow in color for safety.

4 Claims, 5 Drawing Sheets

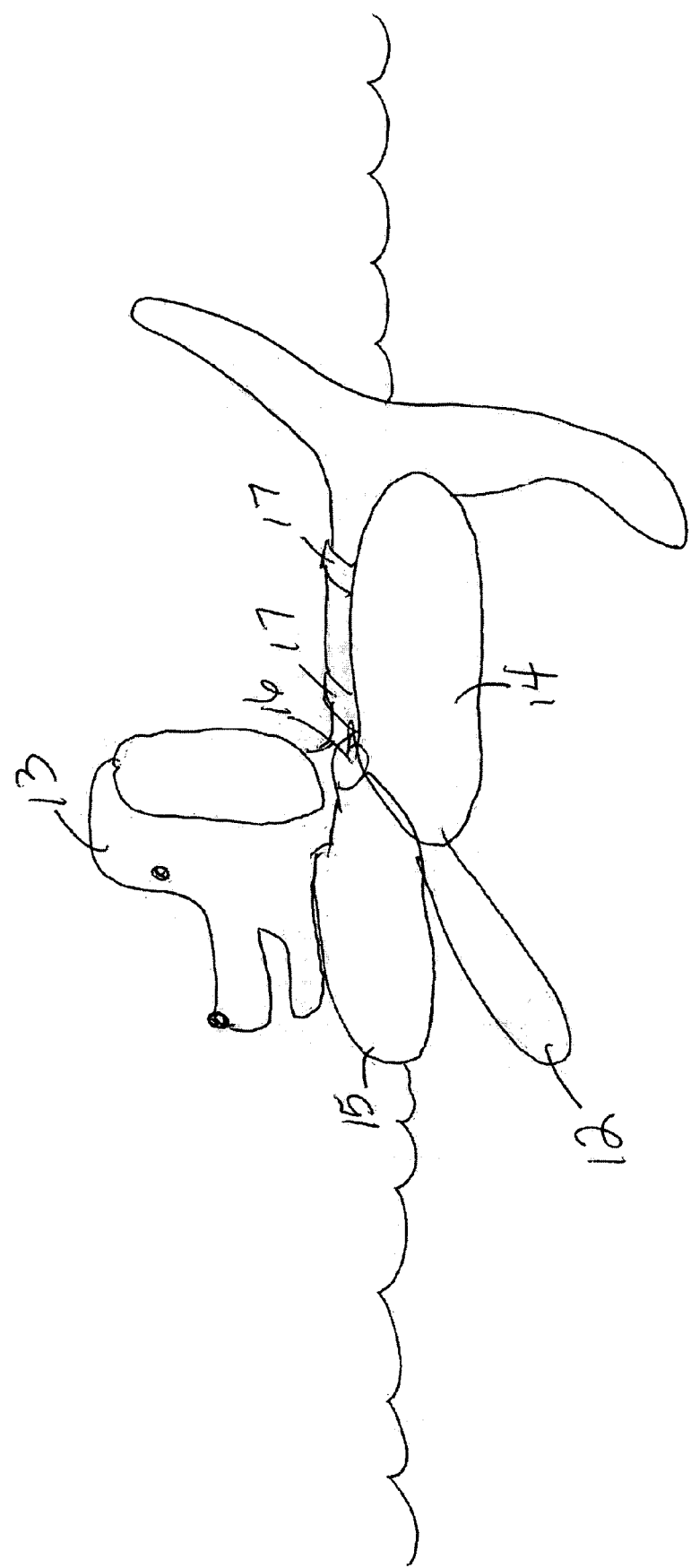

ANIMAL FLOTATION DEVICE

PRIOR APPLICATION

This application emanates from a prior Provisional Patent Application filed Oct. 12, 2004.

FIELD OF THE INVENTION

This invention relates to the field of flotation devices, specifically a flotation device designed for animals, in particular, companion animals, such as dogs of any size.

BACKGROUND OF THE INVENTION

Flotation devices are well known in the art for human beings. Flotation devices have also been developed for animals, specifically companion animals such as dogs. Flotation devices typically consist of one or more flotation means to keep key parts of the animal or person using it above water and less likely to suffer from drowning. Flotation devices often come with a means for attaching the device to the body of the person or animal. Many flotation devices designed for human beings include a portion designed to keep the person's head from sinking should he or she be knocked unconscious.

Prior art in the field of animal flotation devices are include Warzecha in U.S. Pat. No. 6,273,774. Warzecha teaches of an animal flotation device of particular use for dogs that includes a flat, rectangular platform supported by two floats located on opposite sides of the platform. The Warecha device, however, does not include a flotation portion that keeps the head of the animal above water. Accordingly, there exists a need for an animal flotation device that keeps the animal's head above water, providing the head with support to prevent the animal's head and nose from being submerged in water should the animal be knocked unconscious or otherwise unable to keep its own head above water.

SUMMARY OF THE INVENTION

In the preferred embodiment of the invention, an animal flotation device is disclosed that includes a supporting center portion that supports the torso of an animal with two holes located toward the front portion of the supporting center portion with radii sufficient to allow for the placement of the front two legs of the animal to enter. This prevents the animal from slipping out. On each side of the supporting center portion are two flotation pods. Each flotation pod is firmly connected as an integral part of the supporting center portion along the sides of the supporting center portion and positioned substantially along the same plane of the supporting center portion.

A third flotation pod is detachably connected to the front portion of the supporting center portion that is loosely connected to the supporting center portion so as to hang out of plane and away from the supporting center portion when the device is not floating on water, but that floats in a position substantially planar to the supporting center portion and on the surface of water once placed therein. While the animal is wearing the device on land, the third flotation pod hangs away from the animal's chin and out of its way until the animal is put in a body of water. The animal can wear the flotation device while on land or on a boat in preparation for entrance into the water and the pod will not be in its way.

The device is attached to the body of the animal through the use of two pairs of straps. The first set of straps is located just behind the front legs of the animal and the second set is located just in front of the rear legs. The straps have quick releases for easy and rapid deployment. The device is made of nylon for durability and is bright yellow in color for safety.

OBJECT OF THE INVENTION

The principal object of the invention is to provide a flotation means for an animal that keeps the animal's head and nose above water when in use.

BRIEF DESCRIPTION OF THE DRAWINGS

FIG. 5 illustrates a side view off the device while being worn by a dog in the water.

DETAILED DESCRIPTION OF AN ENABLING AND PREFERRED EMBODIMENT

Figure 1:
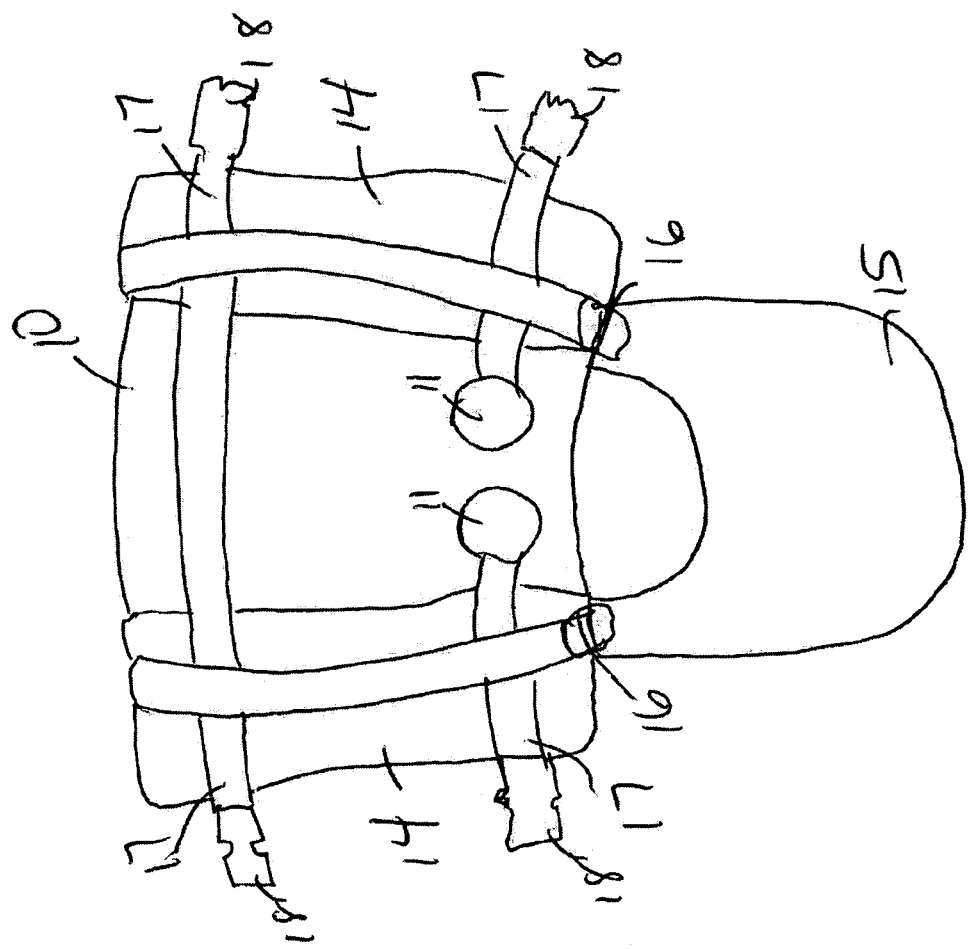
FIG. 1 illustrates a top view of the device while not in use by an animal with the detachable front flotation pod attached to the device.
Figure 2:
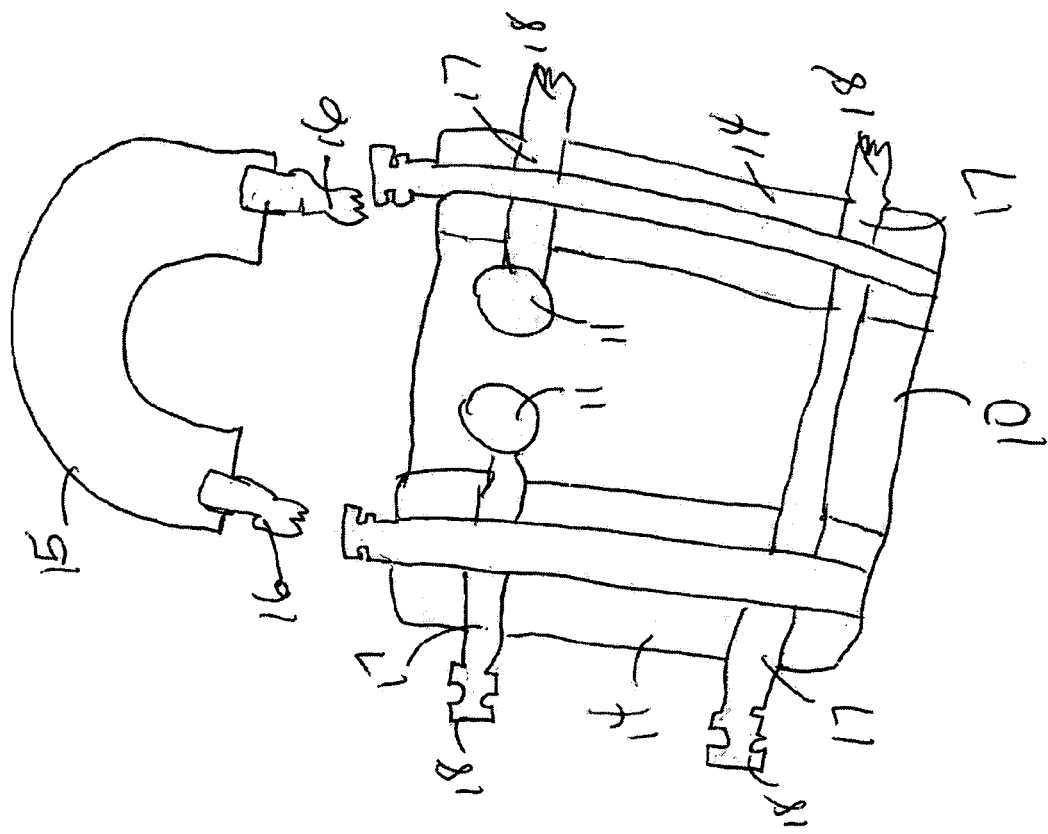
FIG. 2 illustrates a top view of the device while not in use by an animal with the detachable front flotation pod detached from the device.
Figure 3:
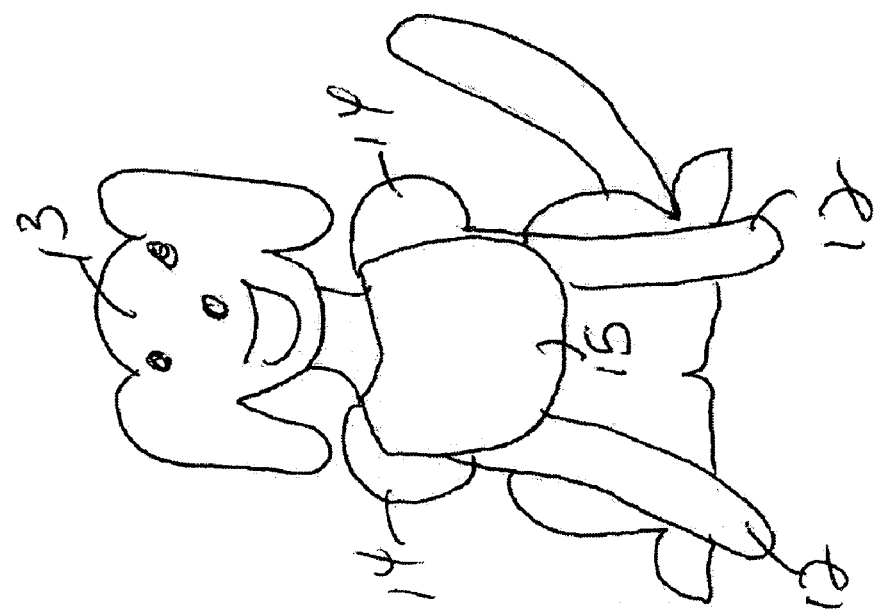
FIG. 3 illustrates a front view of the device while being worn by a dog on land.
Figure 4:
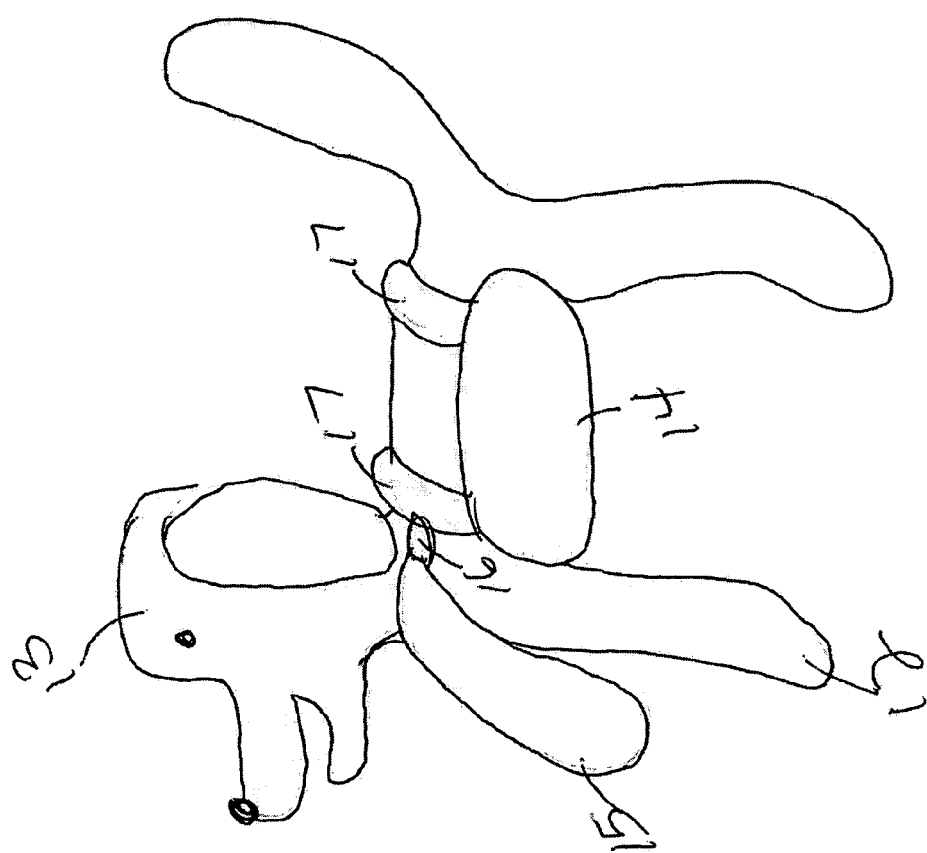
FIG. 4 illustrates a side view of the device while being worn by a dog on land.

For a better understanding of the invention, we turn now to the drawings. FIGS. 1–5 illustrate varying views of the invention. The invention contains a supporting center portion 10 with two holes 11 located toward the front portion of the supporting center portion 10. The two holes 11 have radii sufficient to allow for the placement of the front two legs 12 of an animal 13 therein. This allows the animal 13 to stay secure in the device. On opposite sides of the supporting center portion 10 are two flotation means 14 that are firmly connected along each side of the supporting center portion 10. The two side flotation means 14 are positioned substantially along the same plane as the supporting center portion 10.

A third detachable flotation means 15 is connected toward the front portion of the supporting center portion 10 and is loosely connected to the supporting 10 center portion with quick release snaps 16 allowing the detachable flotation means 15 to hang out of plane and away from supporting center portion 10 when the device is not in use on water. When the device is in use on water, the detachable flotation means 15 floats in a position substantially planar to the supporting center portion 10 and side flotation means 14.

The device is attached to the animal 13 through the use of straps 17 that are held together with quick release snaps 18.

The illustrations and examples provided herein are for explanatory purposes and are not intended to limit the scope of the appended claims, as those skilled in the art will make modifications to the invention for particular uses.

I claim:

1. An animal flotation device comprising
   a supporting center portion;
   two holes located toward the front portion of said supporting center portion, said holes having radii sufficient to allow for the placement of the front two legs of an animal;

a first flotation means firmly connected along one side of said supporting center portion positioned substantially along the same plane as said supporting center portion;

a second flotation means firmly connected to the opposite side of said supporting center portion from said first flotation means, said flotation means being positioned substantially along the same plane as said supporting center portion;

a third flotation means detachably connected to said front portion of said supporting center portion that is loosely connected to said supporting center portion when attached allowing said third flotation means to hang out of plane and away from said supporting center portion when said device is not floating on water, but that floats in a position substantially planar to said supporting center portion and on the surface of water once placed therein;

means for attaching and securing said device to the body of animal.

2. An animal flotation device according to claim 1 wherein said attaching and securing means comprise a first pair of straps, located opposite from one another in substantially the same planar location on opposite sides of said supporting center portion in a position to strap around the body of the animal behind the front legs of said animal and a second pair of straps, located opposite from one another in substantially the same planar location on opposite sides of said supporting center portion in a position to strap around the body of said animal in front of the rear legs of said animal, both pairs of straps containing quick release connects to allow for easy and rapid attachment and detachment from said animal.

3. An animal flotation device according to claim 1 wherein said device is made of nylon.

4. An animal flotation device according to claim 1 wherein said device is bright yellow in color.

* * * * *